Sept. 15, 1925.
N. R. THIBERT
LOCK WASHER
Filed Sept. 4, 1924
1,553,577
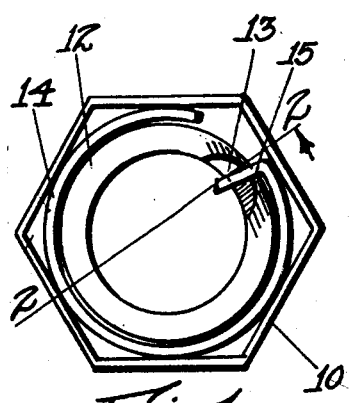
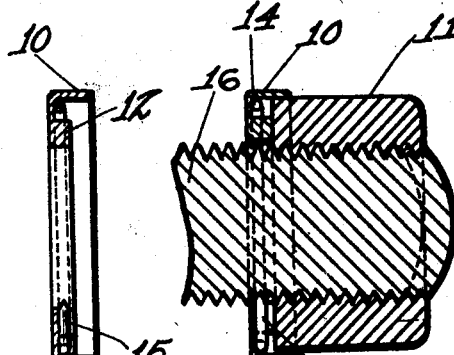
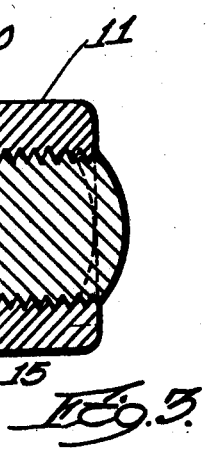
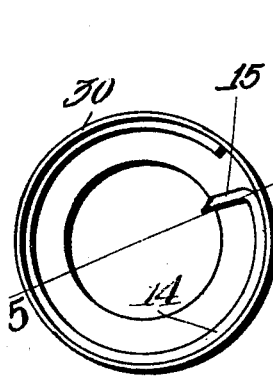
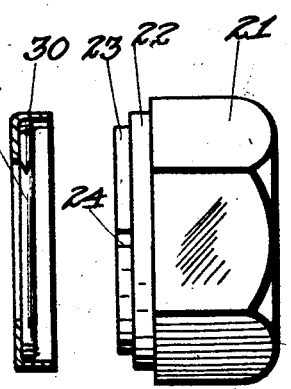
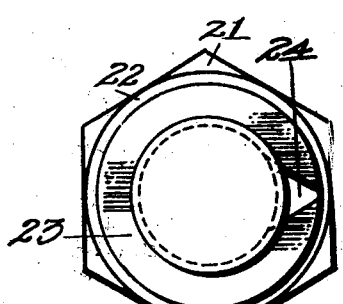
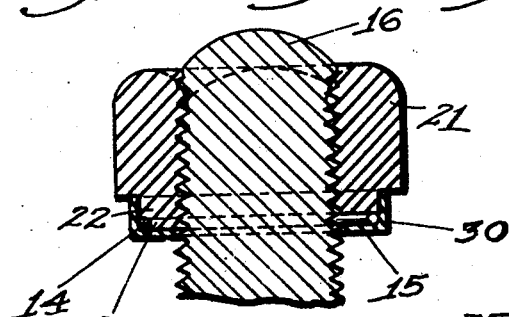
Inventor:
N. R. Thibert
By Attorneys.

Patented Sept. 15, 1925.

1,553,577

UNITED STATES PATENT OFFICE.

NAPOLEON R. THIBERT, OF WORCESTER, MASSACHUSETTS.

LOCK WASHER.

Application filed September 4, 1924. Serial No. 735,952.

*To all whom it may concern:*

Be it known that I, NAPOLEON R. THIBERT, a citizen of the United States, residing at Worcester, in the county of Worcester and State of Massachusetts, have invented a new and useful Lock Washer, of which the following is a specification.

This invention relates to a device to be used in association with a nut but entirely separable and independent therefrom for locking the nut on a screw thread.

The principal object of the invention is to provide a locking device entirely separate from the nut so that it can be manufactured and sold separately, and in the preferred form without modifying the nut in any way. The invention involves a construction in which the washer which is adapted to be applied to the nut so that it cannot be turned relatively thereto will be provided in a very inexpensive manner with a spring pawl for engaging the screw threads and preventing the removal of the washer from the screw backwardly. As the nut fits the washer and cannot be turned independently thereof when they are in association, this also indirectly locks the nut.

This invention is designed to take the place of ordinary spring lock washers, so called, which really do not positively lock the nut but merely bind it. These spring lock washers have to be contracted against the force of the spring when the nut is screwed down. Therefore the spring continually exerts a pressure against the nut to force it off the bolt. This acts, under constant vibration, to unscrew the bolt or at least it exerts a tendency to unscrew it. The present invention has no such undesirable characteristic. Furthermore, in many spring washers, resistance is exerted just as much against screwing the nut up as unscrewing it, while in the present case there is no resistance to the screwing up of the nut, but the unscrewing is prevented with a positive action.

Other objects and advantages of the invention will appear hereinafter.

Reference is to be had to the accompanying drawings, in which—

Fig. 1 is a plan of a lock washer constructed in accordance with this invention shown by itself;

Fig. 2 is a diametrical sectional view on the line 2—2 of Fig. 1;

Fig. 3 is a similar sectional view of the washer in position on the nut and bolt;

Fig. 4 is a view similar to Fig. 1 of a round lock washer constructed in accordance with this invention and showing certain modifications;

Fig. 5 is a sectional view on the line 5—5 of Fig. 4;

Fig. 6 is a side view of the nut which is modified somewhat in order to apply this particular washer thereto;

Fig. 7 is a bottom plan view of the nut; and

Fig. 8 is a sectional view like Fig. 3 showing the device in position.

In the form shown in Figs. 1, 2 and 3, the washer 10 consists merely of a sheet metal hollow washer or cap having flanges constituting its sides shaped to fit the nut 11 to which it is to be applied. In this case, as it is a hex nut, the washer is of hexagonal shape and these flanges are designed to fit over the end of the nut as shown in Fig. 3 so that the nut cannot be turned at all without turning the washer. The washer is provided with an elevated surface 12 annular in shape and having an opening 13 therethrough extending down to the base of the cap. This annular raised surface is spaced from the flanges so as to leave room for a locking spring 14. This spring fits against the flanges all the way around and extends almost entirely around the circumference in contact with the six flanges in this case. It has an integral end 15 projecting inwardly and radially and sharpened at the extreme tip to form a spring pawl for engaging the thread of the bolt 16 to which it is to be applied. This washer can be screwed up on the bolt but cannot be unscrewed on account of this spring pawl.

In operation the washer is simply placed against the nut and the flanges engage over the ends so that it works with it at all times and it serves the purpose of a lock washer which positively engages the nut and prevents the turning of the nut in the wrong direction. It will be seen that the spring is always in the same plane and exerts no force to push the nut off the thread and help unscrew it. The washer is separate from the nut and is entirely independent of it. It is made of such shape as to fit a standard nut and does not require any alteration whatever in the nut. The washers can be made in a different factory from the nuts and sold separately so as to fit the nuts of standard sizes, and do not need to be associated with the nuts on which they are to be put. The washer will fit the nut, if it is a hex, in any one of six positions so there is no difficulty about assembling the parts.

In the form shown in the other figures one of the advantages above mentioned is not secured as the nut 21 is modified by cutting down the flat end with a turning tool to provide a cylindrical projection 22 and a smaller cylindrical projection 23, the latter having an opening 24 through the wall into the internal screw thread.

The rest of the device is very similar to what is shown in Figs. 1, 2 and 3 except that the lock washer 30 has a circumferential flange to fit the cylindrical projection 22. The wire spring 14 is just like the one shown in the other form and it rests in the top of this cap or washer with its spring pawl 15 projecting in through the opening 24 when the parts are assembled. Before assembly, however, this spring is located in position in the washer or cap and is manipulated therewith entirely independently of the nut. It is an independent element which simply fits on the projection 22 while the projection 23 comes inside the spring in the same way as the annular ring 12 in the first form. The spring pawl shown co-operates with the nut by passing into the opening 24. It acts on the pawl in the same manner as described in connection with the first three figures. It will be seen therefore that in this form the lock washer co-operates more intimately with the details of the nut than in the form shown in the first three figures. It takes the washer and nut both to provide the annular or substantially annular space for the spring in this form while in the first form that space is all provided in the washer. The modification of the nut for the purpose of fitting it for this washer is a very simple matter. It is all formed by one tool properly shaped except the slot 24 which also is formed in a very simple manner.

Except for the differences above mentioned, both forms present the advantages set forth in the first part of this specification.

The form shown in the first three figures also has an advantage in that it can be placed on the nut at any one of six points if it is a hex nut, while the form shown in the other figures can be placed only in one position. The wire 15 has to be located in the cap so that the pawl 15 will extend into the slot 24.

Although I have illustrated and described only two forms of the invention I am aware of the fact that modifications can be made therein by any person skilled in the art without departing from the scope of the invention as expressed in the claims. Therefore I do not wish to be limited to all the details of construction herein shown and described, but what I do claim is:—

1. As an article of manufacture, a lock washer having side flanges all around it for preventing a nut from being unscrewed from a bolt constituting a separate element from the nut entirely independent thereof, said flanges engaging the flat sides of the nut to prevent relative rotation and provided with a circular wire spring having an integral end constituting a pawl located entirely within the flanges of the washer for engaging the thread of the bolt independently of the nut.

2. The combination with a lock washer of cup-shaped form having flanges for engaging and fitting the exterior of the nut and provided with a substantially annular space at the end thereof, of a circular spring in said space extending almost entirely around the washer inside the flanges and contacting with said flanges all around and having an inwardly projecting end sharpened to constitute a pawl for engaging in a screw thread to prevent the turning of the washer thereon in a backward direction, said flanges constituting means for connecting the washer with a nut on said screw thread and thereby preventing the nut from turning independently of the washer.

3. As an article of manufacture, a lock washer for preventing a nut from being unscrewed from a bolt constituting a separate element from the nut entirely independent thereof and having an external flange for engaging the side of the nut and conforming to the shape thereof and provided with a circular wire spring having an integral end constituting a pawl located entirely within the flanges of the washer and projecting inwardly to engage the thread of the bolt independently of the nut.

In testimony whereof I have hereunto affixed my signature.

NAPOLEON R. THIBERT.